United States Patent [19]

Lu

[11] Patent Number: 5,223,346
[45] Date of Patent: Jun. 29, 1993

[54] HDPE/POLYPROPYLENE FILM LAMINATES

[75] Inventor: Pang-Chia Lu, Pittsford, N.Y.

[73] Assignee: Mobil Oil Corporation, Fairfax, Va.

[21] Appl. No.: 781,448

[22] Filed: Oct. 23, 1991

[51] Int. Cl.$^5$ .................. B32B 27/08; C08L 23/04
[52] U.S. Cl. .................... 428/516; 428/349; 428/910; 428/484; 525/240; 264/176.1
[58] Field of Search ............... 428/484, 516, 910, 349

[56] References Cited

U.S. PATENT DOCUMENTS

| | | | |
|---|---|---|---|
| 4,377,616 | 3/1983 | Ashcraft et al. | 428/213 |
| 4,521,467 | 6/1985 | Berger | 428/516 |
| 4,522,887 | 6/1985 | Koebisu et al. | 428/516 |
| 4,578,316 | 3/1986 | Clauson et al. | 428/516 |
| 4,870,122 | 9/1989 | Lu | 524/488 |

Primary Examiner—P. C. Sluby
Attorney, Agent, or Firm—A. J. McKillop; G. W. Hager; J. P. O'Sullivan, Sr.

[57] ABSTRACT

The invention relates to a laminate of layer (A) a biaxially oriented high density polyethylene film of at least 50 wt. % of the polyethylene of a density of 0.960 or greater; and layer (B) a biaxially oriented polypropylene film.

7 Claims, No Drawings

HDPE/POLYPROPYLENE FILM LAMINATES

This invention is concerned with film laminates of two different polymers having the utility of a packaging film.

BACKGROUND OF THE INVENTION

All polymeric films possesSboth good and bad characteristics. An organic polymer film that may be an excellent barrier film for excluding the transmission of oxygen and water vapor may be a poor film regarding flexibility, heat sealability, printability, appearance, etc. Polypropylene film per se has poor heat seal characteristics and usually needs to be modified in order to improve its barrier characteristics. Polyethylene films on the other hand, while excellent for structures such as grocery sacks or bread wrappers is not an excellent packaging film for products such as, snack foods, etc. Polyethylene does not have the clarity and high gloss characteristics required by food packagers.

It is an object of the present invention to present a laminated film structure that takes advantage of the best characteristics of both types of polymer films.

SUMMARY OF THE INVENTION

The present invention is concerned with a film combination laminate of:
layer (A) a biaxially oriented high density polyethylene (HDPE) film comprising at least 50 wt. % of HDPE having a density of 0.960 or greater; and
layer (B) a biaxially oriented polypropylene film.

DETAILED DESCRIPTION OF THE INVENTION

As indicated above the laminate of the present invention comprises essentially a layer (A) and a layer (B) laminated together by any appropriate means which will effect a secure bond between the two layers. Layer (A) is preferably a biaxially oriented high density polyethylene film having a density of 0.960 or greater. Films of this type are disclosed in U.S. Pat. No. 4,870,122 issued to P. C. Lu, the disclosure of which is incorporated herein in its entirety. The HDPE layer can be composed exclusively of a single HDPE resin, a mixture of HDPE resins, or of HDPE containing a minor proportion of up to about 10 wt. % microcrystalline wax. Films made with either a blend of HDPE resins or with microcrystalline wax reduce the splittingness of the film which manifests itself as a tendency of the film to break in the TD direction during packaging on vertical, form, fill and seal (VFFS) machinery.

The blends of HDPE polymers can comprise two or more polymers all of which preferably have densities of 0.960 or greater. Blends of HDPE polymers advantageously comprise a major proportion of HDPE having a melt index of 0.6 to 1.2 and one or more polymers having a different melt index.

Terblends have been found particularly desirable. Suitable terblends generally comprise 50 to 98 weight percent, preferably 84 to 96 weight percent of HDPE having a density of 0.960 or higher and a melt index of greater than 0.5 to about 2.0; 1 to 25 weight percent, preferably 3 to 8 weight percent of HDPE having a density of 0.960 or greater and a melt index of 0.1 to 0.5; and 1 to 25 weight percent, preferably 3 to 8 weight percent, of HDPE having a density of 0.960 or higher and a melt index of greater than 2 to about 8. Preferably, the second and third HDPE polymers, which are minor components, are present in about equal amounts.

It is preferred that the HDPE films of this invention be biaxially oriented in an unbalanced manner. By this is meant that the HDPE is oriented to a degree of 1.25:1 to about 2:1 in the machine direction (MD) and to a degree of about 6:1 to about 12:1 in the transverse direction (TD) The HDPE can be coextruded with conventional heat-seal materials, e.g. Surlyn or EP copolymers.

The layer (B) type film is a biaxially oriented polypropylene film. For example, an oriented polypropylene slip film is essentially composed of isotactic polypropylene which contains a minor portion of a coefficient of friction reducing additive present therein. Such an additive, e.g. erucamide, can be present in an amount from about 200 to 400 parts per million. The oriented polypropylene film can also be of the type which has a surface skin layer of a heat sealable material coextruded therewith. This skin can be on one or both sides of the polypropylene core layer. A suitable heat sealable layer can be an ethylene propylene random or block copolymer containing from about 2–6% of ethylene. Another type of polypropylene film which can be employed as the layer (B) herein is described in U.S. Pat. No. 4,377,616 to Ashcraft et al. This type of film is an opaque biaxially oriented polymer film structure of lustrous satin appearance. It is essentially 3 layers, the center layer being a cavitated core layer of polypropylene carrying thin skin layers of non-cavitated polypropylene on the surface thereof.

The laminates of the present invention can be formed by extrusion lamination or adhesive lamination. In extrusion lamination an extruder delivers molten polymer to between the two moving substrates desired to be laminated. The substrates are brought together at the nip of a rubber roll and a chill roll and bonded by means of the molten polymer squeezed therebetween. A convenient bonding polymer would be a low density polyethylene having a density of anywhere from about 0.900 to about 0.929. Another effective laminating material is an ethylene-methacrylic acid copolymer salt ionomer available from DuPont.

In adhesive lamination, two layers are bonded together by means of a tie coat adhesive. The adhesive is dispersed in a vehicle and applied wet to one substrate and the vehicle (water or solvent) is driven off. The two layer are then pressure bonded together e.g. by passing them thru pressure rollers. Convenient adhesives can be any water based acrylic adhesive or a solvent based polyurethane adhesive.

EXAMPLES 1 AND 2

Layers (A)

Two biaxially oriented films (1a and 2a) having 1.1 mil final thicknesses were prepared by coextruding a HDPE layer comprising 95% of the film and a surlyn 1652 (ethylene-methacrylic acid copolymer salt ionomer-heat seal material from DuPont) layer comprising 5% of the layer thickness. The HDPE of film 1 a had a melt index of 1 and a density of 0.960. The HDPE of film 2a was a blend of 90% of the 1a film HDPE with 5% of a HDPE having a melt index of 0.45 and a density of 0.960 and 5% of a HDPE having a melt index of 3.0 and a density of 0.960. Both layers were oriented 1.4 times MD and 10 times TD.

Layers (B)

A 1.25 mil white opaque polypropylene film (1b) was obtained having a core layer of polybutylene terephthalate—cavitated polypropylene and thin skin layers of the same polypropylene but without the PBT. The core amounted to 40% of the film thickness and each skin layer 30%. The film was oriented 8 times TD and 5 times MD. A 0.12 mil coating of a commercially available adhesive Adcote-333 (a polyurethane dispersed in a vehicle, available from Morton Thiokol, Inc.) was applied to one surface and the vehicle evaporated.

A second polypropylene film (2b) of a thickness of 0.45 mil and biaxially oriented 5 times TD and 8 times MD was obtained. This film was coated with a 0.04 mil thickness of the same adhesive as applied to film (1b).

Films (1a) and (1b) were laminated together by means of the Adcote-333 adhesive. The films were laminated by passing them through opposed pressure rolls to form the finished laminate. In the laminate the Surlyn layer is outermost. The films (2a) and (2b) were likewise laminated together.

EXAMPLES 3-5

In these examples essentially the same HDPE film was employed and in each case the films were coated on one side with Surlyn as in Examples 1 and 2.

The HDPE film of Example 3 was laminated to 0.75 mil homopolymer polypropylene slip film containing a stearamide slip additive and a silica anti-block additive. This film had been oriented 8 times TD and 5 times MD. The HDPE film of Example 4 was laminated to a 0.7 mil polypropylene homopolymer which had a coextruded skin of a terpolymer of ethylene, propylene, butene -1 on both sides thereof. The skin layers constituted 4% each of the polypropylene film thickness. The HDPE of Example 5 was laminated to a 0.45 mil homopolypropylene film which had been oriented 8 times TD and 5 times MD. In these examples the high density polyethylene film was extrusion laminated to the polypropylene films employing a low density polyethylene having a density of 0.92 (Chevron 1017). For this lamination a continuous film of the molten low density polyethylene is extruded from a slot die and placed between the two layers (A) and (B). The sandwich is passed between a rubber roll and chill roll to effectively laminate the film together. The LDPE bond thickness is about 0.60 mil in each case. The physical properties of these films are listed below.

| Sample # | 1 | 2 | 3 | 4 | 5 |
|---|---|---|---|---|---|
| Gauge, mil | 2.47 | 1.59 | 2.44 | 2.38 | 2.15 |
| WVTR, g/100 in$^2$, 24 hr, 100° F., 90% RH | 0.17 | 0.20 | 0.15 | 0.16 | 0.18 |
| Lamination bond strength, g/in | 300 | 470 | 340 | 270 | 260 |
| Crimp seal strength g/in, 20 psi, ¾ sec. at 220° F. | 390 | 400 | 370 | 380 | 400 |
| Dead fold | good | good | good | good | good |

The above 5 laminated films were run on a Hayssen VFFS machine at 40 bags per minute. The packaging trial was run successfully with no web break. All the films showed a broad heat seal temperature of 70° F.

Although the present invention has been described with reference to preferred embodiments, it is to be understood that modifications and variations may be resorted to without departing from the spirit and scope of this invention. Such modifications and variations are considered to be within the purview and scope of the appended claims.

What is claimed is:

1. A film combination comprising the laminate of:
   Layer (A) a biaxially oriented high density polyethylene (HDPE) film comprising at least 50 wt. % of HDPE having a density of 0.960 or greater; and
   Layer (B) a biaxially oriented polypropylene film.

2. The combination of claim 1 wherein said HDPE comprises about 50-98 wt % of a first HDPE having a density of at least about 0.60 and a melt index of from about 0.6 to 1.2 and about 1-25 wt % of a second HDPE having a density of about 0.960 and a melt index different from a said first HDPE.

3. The combination of claim 1 wherein said HDPE comprises about 50-98 wt. % of a first HDPE having a melt index of from greater than 0.5 to about 2.0; about 1 to 25 wt. % of a second HDPE having a melt index of from about 0.1 to about 0.5; and about 1 to 25 wt. % of a third HDPE having a melt index of greater than 2 to about 8; and all of said HDPE having a density of about 0.960 or greater.

4. The combination of claim 1 wherein said HDPE film contains up to about 10 wt. % of microcrystalline wax.

5. The combination of claim 1 wherein said oriented polypropylene film has at least one skin layer of a heat sealable polymer thereon.

6. The combination of claim 1 wherein layers (A) and (B) are extrusion laminated together.

7. The combination of claim 1 wherein layers (A) and (B) are laminated together with an adhesive.

* * * * *